United States Patent Office 3,306,890
Patented Feb. 28, 1967

3,306,890
COPPER COMPLEXES OF SULFAMYLPHENYL-
PYRAZOLONE MONOAZO DYESTUFFS
Herman A. Bergstrom, Hamburg, N.Y., assignor to Allied Chemical Corporation, New York, N.Y., a corporation of New York
No Drawing. Filed Apr. 29, 1963, Ser. No. 276,180
3 Claims. (Cl. 260—147)

This invention relates to novel azodyestuffs containing copper. More particularly it relates to novel copper complexes of o-substituted phenylazopyrazolone dyes which are characterized by their ability to color superpolyamides in level shades.

Commercially available textile materials made of superpolyamide polymers include nylon 6 derived from ε-caprolactam, nylon 66 derived from hexamethylenediamine and adipic acid, and nylon 11 derived from ω-aminoundecanoic acid. Such textile materials in the form of yarns, threads, foils, and woven fabrics composed in whole or in part of such superpolyamides are used extensively in the production of garments, draperies, floor coverings, and the like articles.

The superior strength and other desirable qualities of these superpolyamide derived textile materials has resulted in the increasing utilization of these textiles and a corresponding increasing demand for dyestuffs suitable for coloring such textiles. Numerous classes of organic dyestuffs have been devised which do produce desirable colorations on these important textile materials. However, most of these dyestuffs are deficient in one or more qualities, e.g., fastness to light, to washing, levelness of shade, etc.

The inability of many dyestuffs to color superpolyamide derived textile materials in level shades is a serious problem in this art. The problem originates, perhaps to a major degree, in the production of the superpolyamide material. During the spinning, weaving, and the like operations, the polymer is subjected to tension during which the polyamide molecules undergo orientation. Variations in the tension lead to variations in orientation. These variations may influence the number of dye sites present in the polymer. The problem is particularly serious in the dyeing of woven textiles wherein superpolyamides of more than one production lot are combined during the weaving process. When dyed such fabrics present a striped effect due to the differential dyeing of the several lots of superpolyamide. Such striped effects are called "barré," and, obviously, are undesirable.

It is therefore a principal object of this invention to devise a novel group of dyestuffs which dye superpolyamide derived textile materials in level shades free from barré.

Another object is to devise a novel class of copper containing monoazo dyestuffs.

Other objects and advantages of the present invention will be apparent from the following detailed description thereof.

The dyestuffs of the present invention are copper complexes of a diazotized 2-aminophenol or a 2-aminobenzoic acid coupled with a 1(sulfamylphenyl)-3-methyl-5-pyrazolone. The diazo component can be substituted in the 3,4,5 or 6 or in any two of these positions by nitro, halogen, lower hydrocarbon alkyl, lower hydrocarbon alkoxy, sulfamyl or carbamyl groups.

The novel monoazo dyestuffs of this invention are copper complexes of monoazo dye having the following general formula

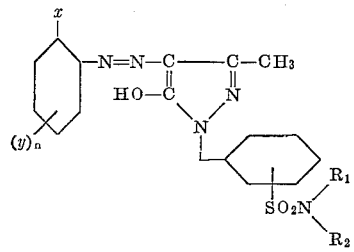

wherein $x$ is selected from the group consisting of hydroxyl and carboxyl groups, $y$ is selected from the group consisting of hydrogen, nitro, halogen, lower hydrocarbon alkyl, lower hydrocarbon alkoxy, sulfamyl

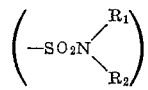

and carbamyl

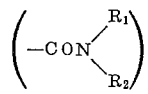

$n$ is 1 or 2 when $y$ is other than hydrogen, $R_1$ is selected from the group consisting of hydrogen and lower hydrocarbon alkyl, and $R_2$ is selected from the group consisting of hydrogen and lower hydrocarbon alkyl.

These novel dyestuffs can be prepared by diazotizing an aminobenzene of the formula

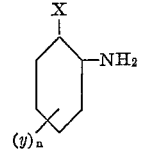

and coupling the diazotized product, in weakly aqueous alkaline media, with a 1(sulfamylphenyl)-3-methyl-5-pyrazolone of the formula

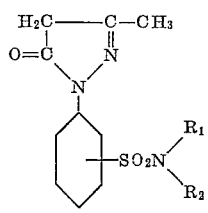

wherein $x$, $y$, $n$, $R_1$ and $R_2$ have the above described connotations. The resulting monoazo product can be precipitated, as by salting, from solution, isolated in any convenient manner, as by filtration, and thereafter converted to the copper complex in the conventional manner, as by treatment with a copper salt in an organic solvent medium. Alternatively, the coupling reaction and the metallization can be carried out simultaneously by adding the diazo to an aqueous ammoniacal solution of a copper salt and the pyrazolone coupling component.

The amines suitable for use as the source of the diazo component of the novel dyestuffs can be 2-aminophenols or anthranilic acid compounds.

Representative of the 2-aminophenols which are suitable include the following specific compounds:

2-aminophenol
4-nitro-2-aminophenol
5-nitro-2-aminophenol
5-chloro-2-aminophenol
4-bromo-2-aminophenol
3-chloro-2-aminophenol
5-sulfamoyl-2-aminophenol
4-N-methylsulfamoyl-2-aminophenol
6-chloro-4-N,N-diethylsulfamolyl-2-aminophenol
4-carbamoyl-2-aminophenol
5-amoxy-2-aminophenol
4-bromo-6-ethoxy-2-aminophenol
5-methyl-2-aminophenol
6-methoxy-2-aminophenol
6-chloro-4-butoxy-2-aminophenol
4-methyl-6-nitro-2-aminophenol
6-methyl-4-nitro-2-aminophenol Anthranilic acid compounds which are suitable as the source of the diazo component include anthranilic acid itself and the following derivatives thereof:

5-chloroanthranilic acid
5-nitroanthranilic acid
3-nitroanthranilic acid
4-bromoanthranilic acid
5-carbamoylanthranilic acid
4-chloro-5-nitroanthranilic acid
3,5-dibromoanthranilic acid
4,6-dichloroanthranilic acid
5-diethylsulfamoylanthranilic acid
4,5-dimethoxyanthranilic acid
5,6-dimethylanthranilic acid
3,5-dinitroanthranilic acid
5-ethylanthranilic acid Suitable coupling components for use in the preparation of the novel dyestuffs include the following representative compounds:

1(4-sulfamolylphenyl)-3-methyl-5-pyrazolone
1(3-sulfamolylphenyl)-3-methyl-5-pyrazolone
1(3,N-methylsulfamolylphenyl)-3-methyl-5-pyrazolone
1(4,N-ethylsulfamoylphenyl)-3-methyl-5-pyrazolone
1(3,N,N-dimethylsulfamoylphenyl)-3-methyl-5-pyrazolone
1(3,N-methyl-N-propylsulfamoylphenyl)-3-methyl-5-pyrazolone The metallization step can be effected by reaction of the monoazo dyestuff with an agent yielding copper, such as cupric acetate, cupric sulfate, cupric acetylacetonate, cupric formate and the like, in the presence of an organic solvent, e.g., diethylene glycol, dimethyl formamide, glycerine, ethoxyethanol ("Cellosolve") and monoethylether of diethylene glycol ("Carbitol").

The metallization step can also be carried out simultaneously with the coupling operation. In this alternate procedure, the diazo is added to an aqueous ammoniacal solution of a copper salt containing the coupling component.

The novel copper containing monoazo dyestuffs of the present invention are substantially insoluble in water. They are applied to the superpolyamide material in the manner of the well known "dispersed dye" class of dyestuffs. As is well known, this class of dyestuffs is applied with the assistance of dispersing agents which function to maintain the dyestuff in suspension in the dyebath during the dyeing operation. It is customary in this art to prepare the dyestuff by subdividing the dyestuff as by micropulverizing, sand grinding and the like, in the presence of one or more, preferably a mixture of dispensing agents. The dispersion of the dyestuff thus obtained may be dried or used as an aqueous paste. The dyestuff dispersion is then added to the dyebath, which may or may not contain dyeing assistants or other adjuvants customarily employed and the material to be dyed entered into the aqueous dyebath which is preferably maintained neutral or slightly acid (pH 4–7) and worked in the usual manner.

The dispersing agents used are well known in the art of preparing disperse dyestuffs. It is usually advantageous and hence preferable to use a mixture of dispersing agents since no one agent has the desired combination of properties (wetting, dispersing, etc.) which can usually be obtained with a suitable mixture. The dispersing agents may be of the non-ionic, cationic or preferably anionic type. Typical of the preferred agents are sodium lignin sulfonates, waste sulfite cellulose liquors, formaldehyde condensation products of alkyl naphthalene sulfonates, formaldehyde condensation products of naphthalene-B-sulfonates, polymerized formaldehyde naphthalene sulfonates and the like.

The novel dyestuffs of the present invention produce strong yellow shades on superpolyamide derived textile materials which possess excellent fastness to light, washing, dry-cleaning solvents. The colorations produced are characterized especially by the levelness of their shades, i.e., the freedom from barré.

These novel dyestuffs, while of especial value in the coloration (i.e. dyeing and printing) of superpolyamide fibers, may be employed also for coloration of other materials such as silk, wool, leather, cellulose esters and ethers, polyesters and various other synthetic fibers. They are useful also in the coloration of artificial resins and plastics in the usual manner.

The following examples illustrate the preparation of the dyestuffs of the present invention. It is, however, to be distinctly understood that the invention is not to be limited by the specific details of these examples since, as will be readily apparent, changes can be made in these details without departing from the scope or spirit of the invention. The temperatures are given in degrees centigrade and the parts and percentages are by weight.

*Example 1*

(A) *Coupling.*—To a solution of 13.7 parts of anthranilic acid in 150 parts of water and 9 parts of aqueous caustic soda, 28.75 parts of 32° Bé. hydrochloric acid are added. The slurry is cooled to 0° with ice and about 25 parts of 30% aqueous sodium nitrite are added. The mixture is agitated for ½ hour and then the excess nitrous acid is destroyed with sulfamic acid.

A mixture of 29 parts of 1(3-sulfamoylphenyl)3-methyl-5-pyrazolone (96%=27.84 parts 100%) in 350 parts of water, 13.5 parts of 28% aqua ammonia and 30 parts of soda ash is warmed to 50° and then cooled with ice to 0°. The diazo solution prepared above is added and the mixture is agitated at 0° to 5° for about 16 hours. The mass is permitted to stand until its temperature rises to 25° at which time sodium chloride in amount equivalent to 10% of the coupling mixture is added. The resultant slurry is filtered. The filter cake is washed with 10% aqueous sodium chloride and with water. The washed cake is dried at 60° in an oven.

(B) *Metallization.*—A mixture of 10 parts of the monoazo coupling product prepared in part A above, 3 parts of cupric acetonylacetonate and 75 parts of dimethylformamide is heated to and maintained at 115° to 125° for two hours. The mass is agitated while it cooled to about 25° and then it is poured into 100 parts of water. Following the addition of 20 parts of sodium chloride, the slurry is filtered. The filter cake is washed well with aqueous sodium chloride and then sucked "dry" to give 33 parts of color cake. A portion (6 parts) of this cake is sand ground in admixture with 1 part of Tamol N (formaldehyde condensation product with naphthalene-B- sulfonic acid) and 1 part of Marasperse N (sodium lignin sulfonate). The dispersed dye, which has the formula

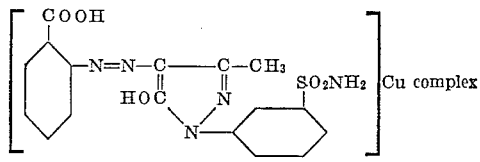

produces strong yellow shades on nylon 6 which are fast to light and which are free from barré. As compared with the known analogous chromium complex compound, the dyeing on superpolyamide fiber obtained with the novel copper complex compound prepared above possess equal fastness to light but are superior with respect to levelness.

*Example II*

A mixture of 15.5 parts anthranilic acid in 170 parts of water and 31 parts of 20° Bé. hydrochloric acid is agitated for 15 minutes and then cooled to between 0° and 5° with ice. To this mixture is slowly added (15 minutes) a solution of 8 parts of sodium nitrite in 40 parts of water. The diazo is agitated for at least ½ hour and then the excess nitrous acid is destroyed with sulfamic acid.

While the diazotization is proceeding, the coupling solution is prepared by dissolving 31 parts of cupric sulfate ($CuSO_4 \cdot 5H_2O$) in 125 parts of water; the solution is cooled to 25° and 40 parts of aqua ammonia (28%) are added. Thereafter a solution of 1(3-sulfamoylphenyl)-3-methyl-5-pyrazolone in 380 parts of water and 40 parts of aqua ammonia is added to the ammoniacal cupric sulfate solution. The resultant mixture is cooled to 0° to 5° and to it is slowly (about 1 hour) added the diazo solution prepared above. The mixture is agitated at 0° to 5° for one hour, and after the addition of 1.3 parts of aqua ammonia, the slurry is filtered. The filter cake is washed with a 150 parts of a solution of 10% aqueous sodium chloride containing 3.5 parts of aqua ammonia. The resultant product is substantially identical with the copper complex of Example 1.

*Example III*

A mixture of 154 parts of 4-nitro-2-aminophenol, 500 parts of water and 287.5 parts of 20° Bé. hydrochloric acid is agitated for one hour and then cooled to 0° by the addition of 500 parts of ice. To this mixture sufficient 30% aqueous sodium nitrite is added to give a positive test for nitrous acid which persists for one hour. The excess nitrous acid is destroyed with sulfamic acid.

The diazo slurry is then slowly added to a solution of 265 parts of 1(3-sulfamoylphenyl)-3-methyl-5-pyrazolone in 1500 parts of water, 135 parts aqua ammonia and 300 parts of soda ash cooled to 5° with ice. The coupling mixture (pH=9.6) is agitated for about 16 hours and then 600 parts of sodium chloride are added. The resultant slurry is filtered and the cake is washed with 800 parts of 12½ aqueous sodium chloride. The washed cake is dried.

To a mixture of 96.5 parts of the above filter cake of monoazo product slurried in 400 parts of ethylene glycol, a slurry of 22.5 parts of cupric acetate in 66 parts of ethylene glycol and about 10 parts of diethanolamine, is added at 100°. The mixture is heated to 120° to 125° and maintained thereat for about 2 hours. The resultant mass is agitated while cooling to about 25° for about 16 hours. The mixture is diluted with 500 parts of water and the slurry filtered and washed with cold water. The resultant monoazo product is the copper complex of the formula

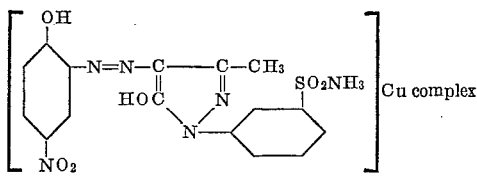

On being dispersed with Tamol N and Marasperse N and sand ground, the dyestuff composition produces strong yellow shades on superpolyamide textile material which are level (free from barré) and fast to light (240 hours in Fade-Ometer). By contrast, the analogous nickel and cobalt complexes produce on polycaproamide textile material dyeings of inferior levelness to those obtained with the novel copper complex dyestuff of this example.

I claim:

1. A copper complex of a monoazo dyestuff having the formula:

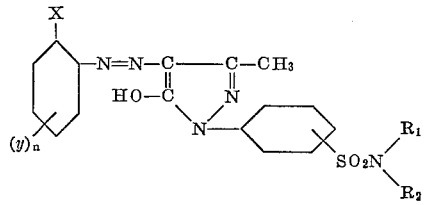

wherein x is selected from the group consisting of the hydroxyl and carboxyl groups;

y is selected from the group consisting of hydrogen, nitro, chlorine, bromine, lower hydrocarbon alkyl, lower hydrocarbon alkoxy,

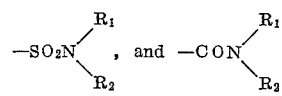

n is a whole number not exceeding two when y is other than hydrogen; and $R_1$ is selected from the group consisting of hydrogen and lower hydrocarbon alkyl and $R_2$ is selected from the group consisting of hydrogen and lower hydrocarbon alkyl.

2. The copper complex of the monoazo dyestuff of the formula:

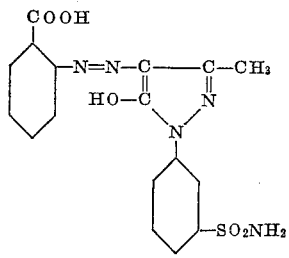

3. The copper complex of the monoazo dyestuff of the formula:

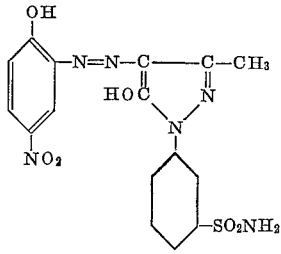

(References on following page)

References Cited by the Examiner

UNITED STATES PATENTS

| | | | |
|---|---|---|---|
| 1,877,615 | 9/1932 | Straub et al. | 260—147 |
| 2,330,828 | 10/1943 | Lubowe et al. | 260—163 |
| 2,653,926 | 9/1953 | Zickendraht et al. | 260—147 |
| 2,673,201 | 3/1954 | Zickendraht et al. | 260—147 |
| 2,806,760 | 9/1957 | Brassel et al. | 8—42 |
| 2,809,962 | 10/1957 | Freyermuth et al. | 260—147 |
| 2,829,139 | 4/1958 | Strobel et al. | 260—147 |
| 2,880,177 | 3/1959 | Lyons et al. | |
| 2,900,217 | 8/1959 | Waning | 8—42 |
| 3,135,730 | 6/1964 | Heyna et al. | 260—147 |
| 3,144,437 | 8/1964 | Uehlinger | 260—147 |

FOREIGN PATENTS

| | | |
|---|---|---|
| 573,359 | 3/1959 | Canada. |
| 588,859 | 12/1959 | Canada. |

CHARLES B. PARKER, *Primary Examiner.*

REYNOLD J. FINNEGAN, FLOYD D. HIGEL,
*Assistant Examiners.*